Patented June 17, 1952

2,600,943

UNITED STATES PATENT OFFICE 2,600,943

DETACKIFYING AND CURE ACTIVATION COMPOSITIONS

Edward A. Van Valkenburgh, Greene, N. Y.

No Drawing. Application April 25, 1951,
Serial No. 222,935

10 Claims. (Cl. 106—243)

This invention relates to new compositions intended particularly as processing aids for use in the compounding and vulcanization of natural rubber and synthetic rubber and for compounding with synthetic resins, etc.

The new compositions are made by the over-neutralization of stearine pitch, diluted with a hydrocarbon diluent, with a strong aliphatic amine, and particularly an aliphatic polyamine; with the excess of amine sufficient to convert all of the fatty acids of the stearine pitch into amine salts and to leave a regulated excess of amine.

These new compositions are valuable detackifying agents which, when incorporated in the rubber or resin composition, serve as internal lubricants and give the uncured batches improved liberation from metal surfaces during raw processing operations such as mill or Banbury mixing, calendering, extrusion, etc. They also provide a valuable cure-activation effect during vulcanization.

It is well known in the art that many synthetic resins and synthetic rubbers (especially butyl rubber and neoprene) are extremely tacky and troublesome to process before cure, particularly when highly loaded with non-black mineral fillers such as clay or hydrated calcium silicate, for example. Difficulty often is encountered during the preliminary mixing of the composition, due to the sticky adhesion of the resin or rubber matrix to the rolls of the mill or to the rotors of the Banbury. Difficulty is also met with in calendering operations, especially when the batches have to be warmed up successively prior to calendering.

In an attempt to overcome the difficulties in handling such tacky compositions, expensive organic lubricants have been resorted to, such as for example tributoxyethyl phosphate. Aside from the expense of such lubricants, they are difficult to incorporate, which slows up the mixing operations and increases power consumption.

The new compounding compositions of the present invention have important advantages because of their detackifying efficiency and their high compatibility with resins and synthetic rubbers such that they are quickly taken up during mixing with a minimum loss of efficiency.

The new compositions are prepared from stearine pitch by dilution with a hydrocarbon diluent and over-neutralization with a regulated amount of a strong aliphatic amine. The stearine pitch used is a cheap byproduct remaining as the distillation residue from the refining and distillation of crude fatty acids, of animal or vegetable origin. The stearine pitch is advantageously soft stearine pitch. Such stearine pitch contains the decomposition products and reaction products and non-volatile or non-volatilized products remaining as a still residue after the fatty acids have been distilled therefrom. The stearine pitch is a complex mixture which, in addition to a free fatty acid content, contains saponifiable and other constituents which make the diluted and over-neutralized amine soaps particularly advantageous as a compounding material.

There is some variation in the composition of such soft stearine pitches. They contain, for example, around 20%–40% free fatty acid, and also contain a substantial percentage of saponifiable fatty matter, as well as non-saponifiable constituents. The saponification value may thus range e. g. from 120 to 170, and the acid number from 30 to 40.

The amines which are used for over-neutralization of the stearine pitch are strong aliphatic amines and particularly aliphatic polyamines which contain both terminal amine groups and intermediate imine groups. With monobasic amines, for example, butylamine or amylamine, only a monoacid soap is formed from one molecule of amine and one molecule of fatty acid, and any excess amine used for over-neutralization of the stearine pitch remains dispersed in the resulting diluted amine soap product as free amine.

With polyamines containing two amine groups and intermediate imine groups, such as are present in diethylene triamine, triethylene tetramine, and tetraethylene pentamine, there are present two free amine groups and one or more intermediate imine group which can react with two molecules of fatty acids to form a diacid amine soap or with three molecules of fatty acid to form a triacid amine soap and which can also react through only one amine group with one molecule of fatty acid to form the monoacid amine soap with a free amine group and one or more imine groups remaining. When such polyamines are used to produce over-neutralized amine soaps with the stearine pitch, the fatty acid will be largely combined as a diacid amine soap and may be combined to a considerable extent as a monoacid amine soap with a free amine group. I have found diethylene triamine and tetraethylene pentamine particularly advantageous polyamines to use for over-neutralizing the diluted stearine pitch to form the new compounding material. In addition to their two amine groups at the end of the molecule, they have intermediate imine groups.

The extent of the over-neutralization of the stearine pitch with the amine can be varied. I have found an over-neutralization of about 25% to 50% advantageous. The excess of amine over that required for neutralization will in general be around 5% or more, and may be as much as 30% or 50% or more. In calculating the equivalent amount of polybasic amine such as polyethylene polyamine, the molar equivalency is advantageously computed solely with respect to the two terminal amine groups and without allowing for the intermediate secondary amine groups which are less reactive. The secondary amine groups are nevertheless reactive and the equivalent amount of polybasic amine can be calculated where the molar equivalency is computed with respect to both the terminal amine groups and the intermediate secondary amine groups, with over-neutralization to the extent of e. g. 10% or more on this basis.

The amount of amine required for neutralization of the fatty acid content of the stearine pitch will be based on the acid number of the pitch. With pitches of varying acid content and acid number, there will be a varying amount of amine soap formed in the final composition, but for uniformity it is important to use the same excess of amine above the variable molar equivalent.

By using a regulated excess of amine, over that required to neutralize the fatty acids and form amine soaps, a substantially uniform composition from the standpoint of rate of cure of rubber compounds can be obtained, even with pitch of varying acid number and compositions of varying soap content in the final composition.

The regulated excess of amine, whether present as free amine or as monoacid or polyacid salts of polyamines, gives a resulting composition with basic properties due not only to free amine groups of free amines when present, but also to free amine groups of polyamines which are present as monoacid or polyacid salts. And the intermediate imine groups of polyalkylene polyamines containing such groups also appear advantageous in giving compositions with valuable properties for use in rubber compounding and vulcanization.

The improved cure-activation effect of the new compositions during vulcanization and the improved detackifying effect of the compositions during preliminary compounding and preparatory treatments appear to be due in part to the regulated excess of amine and in part to the amine soap formed from the fatty acids of the stearine pitch, and in part to the non-fatty acid constituents of the stearine pitch. For uniform cure-activation, it is important to keep the excess of amine constant, even where successive batches of stearine pitch treated may vary somewhat in fatty acid content.

The aliphatic amine reagents used are relatively expensive, and it is desirable not to use any greater excess than is necessary for the desired cure-activation and other properties. I have obtained substantial cure-activation with an excess of amine reagent equivalent to an acid number of around 3.0 to 5.0, especially in GR–S or natural rubber compounding. I have found that an excess of amine, equivalent to an acid number of around 8.0 to 10, or higher, provides a greater factor of safety with respect to cure-activation, particularly for the highly diluted fluidified product.

I have also found it important, in making the new compositions, to dilute the stearine pitch with a diluent and particularly with a hydrocarbon diluent, such as petroleum oils or naphtha, aromatic petroleum oils, or coal tar oils, which are non-volatile under processing conditions, e. g., a paraffine base petroleum fraction having a boiling point range of about 300 to 360° F., or aromatic process oils obtained as byproducts in catalytic cracking having high aromatic properties, such as the aromatic process oil sold under the trade name "WS–945 Process Oil" by Esso Standard Oil Co., having a specific gravity of 0.982, a pour point of +40° F., an aniline number of 108, an iodine number of 6.2 and a flash point of 425° F. The diluting of the stearine pitch with the hydrocarbon diluent facilitates the neutralization of the stearine pitch fatty acids with the amine and gives a product more readily handled and used for compounding purposes. The undiluted amine soaps of stearine pitch are relatively stiff pastes with a characteristic unctuous, somewhat waxy consistency. But by diluting the stearine pitch with a sufficient amount of a hydrocarbon diluent, a liquid product can be produced which can be more readily handled and incorporated and used.

In making the new composition, the stearine pitch is diluted with the hydrocarbon diluent, using an amount of diluent which will give a stable, homogeneous liquid product. The dilution of the stearine pitch with hydrocarbon oil can in some cases be carried out at ordinary temperatures, but is more advantageously carried out by heating and premelting the stearine pitch, e. g., to a temperature of around 350° F. for one hour, followed by cooling to around 250° F. and adding the hydrocarbon oil at this temperature with stirring and further cooling to around 200° F. before the amine is added. The amine is advantageously added slowly, well below the surface of the diluted stearine pitch, with effective agitation and continued agitation as the amine reagent is slowly added, so that exothermic heat of reaction does not greatly increase the temperature.

The invention will be further illustrated by the following specific examples, but it will be understood that the invention is not limited thereby.

*Example I*

100 parts of soft stearine pitch are diluted with 200 parts of petroleum oil, and there are gradually added, at ordinary temperature, 6.75 parts of tetraethylene pentamine, with introduction of the amine well below the surface of the diluted stearine pitch and with thorough and continued agitation during the addition.

The soft stearine pitch of this example had an acid number of 32. The molar equivalency of the tetraethylene pentamine reagent was computed solely with respect to the two terminal amine groups and without allowance for the three intermediate secondary imine groups which are substantially less reactive. The amount of tetraethylene pentamine used is sufficient to neutralize the acidity of the stearine pitch and to provide an excess of amine (not including the secondary amine groups) corresponding to an acid number of 8.0. This corresponds to 125% over-neutralization of the stearine pitch on the basis of the primary amine groups alone. And the still further excess of free secondary amine groups also enhances the cure-activation efficiency of the product.

In such over-neutralized product, the excess tetraethylene pentamine may, to a greater or less extent, be present as free amine; but it may also be present, to a considerable extent, as monoacid salts which still have a free amine group as well as secondary amine or imine groups. The free fatty acids of the stearine pitch will be, for the most part, combined as diacid salts; but they may be, to a very considerable extent, combined as monoacid salts of the polyamines. The fatty acids will thus be combined as diacid amine soaps or monoacid amine soaps, while the tetraethylene pentamine will be largely combined as diacid amine soaps with the excess present as free amine or as monoacid amine soaps. I am led to believe that, with tetraethylene pentamine and other polyalkylene polyamines having intermediate secondary amine or imine groups, the excess amine is largely present as monoacid amine soaps rather than as free excess amine in an uncombined state. But whether the excess amine is present as free amine or as partly neutralized amine soaps, the presence of a regulated excess of amine over and above that corresponding to the fatty acid of the stearine pitch seems advantageous from the standpoint of cure-activation when the resulting compounds are used for rubber compounding and vulcanization.

*Example II*

100 parts of soft stearine pitch, having an acid number of 32, were diluted with 300 parts of petroleum oil, and there were gradually added, well below the surface of the diluted mixture, 6.75 parts of tetraethylene pentamine at ordinary temperature and with thorough and continuous agitation during the gradual addition of the amine.

The composition of this example, although diluted with a larger amount of hydrocarbon oil than that of Example I, nevertheless showed similar cure-activation effect when used in rubber compounding.

The above compositions are liquid at ordinary temperature or when warmed. They are valuable compositions for use as detackifying and cure-activation agents in rubber compounding, particularly with butyl rubber and neoprene.

The advantages of the new compositions will be illustrated by the following examples, illustrating their use with butyl rubber and neoprene.

*Example III*

A non-black butyl inner tube composition was made of the following ingredients in the following proportions:

| | |
|---|---|
| GR-I (butyl rubber) | 100. |
| Clay | 50. |
| Hydrated calcium silicate | 30. |
| Iron oxide | 5. |
| Zinc oxide | 5. |
| Tetramethyl thiuram disulfide | 1.0 |
| Mercaptobenzothiazole | 0.5 |
| Sulfur | 1.5 |
| Product of Example I | 3. |

The Scott Plasticity of the resulting compound at 212° F. and 5 pounds was 197.

The compound was subjected to curing at 70 pounds steam pressure for varying periods of time, and the resulting cured products showed the following test results:

| Cure at 70 lbs. | M300% | M500% | Tensile | Per Cent Elongation | Permanent Set | Durometer I-30'' |
|---|---|---|---|---|---|---|
| 7½' | 180 | 360 | 1130 | 860 | 80 | 56-45 |
| 10' | 230 | 440 | 1250 | 840 | 79 | 56-48 |
| 15' | 260 | 490 | 1,340 | 820 | 74 | 58-50 |
| 20' | 300 | 550 | 1,390 | 810 | 74 | 58-50 |

*Example IV*

A neoprene cable cover was compounded of the following ingredients in the following proportions:

| | |
|---|---|
| GR-M-10 (neoprene) | 100. |
| Extra light calcined magnesia | 4. |
| Zinc oxide | 5. |
| Diortho tolylguanidine salt of dicatechol borate | 1.0 |
| Phenyl alpha naphthylamine | 3. |
| Petrolatum | 2. |
| Hydrated calcium silicate | 60. |
| Product of Example I | 10. |

The resulting product showed a Scott Plasticity at 212° F. and 5 pounds of 256.

The product was cured at 40 pounds steam pressure for the time indicated in the following table, and gave the test results shown in the table:

| Cure at 40 lbs. | M300% | M500% | Tensile | Per Cent Elongation | Permanent Set | Durometer I-30'' |
|---|---|---|---|---|---|---|
| 15' | 540 | 910 | 1,810 | 910 | 49 | 64-60 |
| 30' | 690 | 1,020 | 1,820 | 810 | 31 | 66-64 |
| 60' | 840 | 1,190 | 1,760 | 730 | 23 | 68-66 |
| 90' | 810 | 1,170 | 1,680 | 700 | 21 | 68-66 |

*Example V*

Highly loaded experimental butyl rubber stocks were made up of 100 parts of butyl rubber with 100 parts of hydrated calcium silicate and 6.0 and 10.0 parts respectively of the product of Example II, and these compounds were compared with similar compounds which did not contain the product of Example II but contained instead 3.0 parts of tributoxy ethyl phosphate. The compositions of Example II were incorporated in the stock much more readily than was the lower percentage of the organic phosphate. The detackifying efficiency of the inexpensive composition of Example II compared favorably with that of the much more costly tributoxy ethyl phosphate.

*Example VI*

100 pounds of soft stearine pitch of acid number 25 are diluted with 100 parts of aromatic petroleum oil, a by-product from the catalytic cracking process having highly aromatic properties (Esso WS-945) by premelting the stearine pitch for one hour at 350° F., cooling to 250° F. and adding the aromatic petroleum oil with continued stirring and cooling to around 200° F. and there was then gradually added 1.69 parts of 85% diethylene triamine with introduction of the amine slowly well below the surface of the diluted stearine pitch and with thorough and continued agitation during the addition.

The molar equivalency of the diethylene triamine in this case was computed with respect to both the terminal amine groups and the intermediate secondary amine group and the amount of diethylene triamine used is sufficient to neutralize the acidity of the stearine pitch and to provide an excess of amine corresponding to around 10% over-neutralization.

*Example VII*

The same stearine pitch and the same aromatic petroleum oil referred to in Example VI were similarly combined and there was gradually added thereto 2.87 parts of diethylene triamine (85%) following the procedure of Example VI.

The amount of diethylene triamine used in this example corresponded to approximately 125% over-neutralization of the stearine pitch on the basis of the primary groups alone.

*Example VIII*

100 parts of the same soft stearine pitch referred to in Example VI and 200 parts of the same aromatic petroleum oil referred to in Example VI were combined as described in Example VI and there was gradually added 3.45 parts of diethylene triamine (85%), following the procedure of Example VI.

The composition thus produced represents an over-neutralization of approximately 50% based on the primary amine groups alone. The use of larger amounts of amine and higher over-neutralization is advantageous with synthetic rubbers such as GR-S (Buna S) containing substantial amounts of free acids.

*Example IX*

Tire tread compositions were made of the following ingredients in the following proportions, these compositions being identified as IX-A, IX-B, IX-C and IX-D:

|  | IX-A | IX-B | IX-C | IX-D |
|---|---|---|---|---|
| GR-S (Buna S) containing 3.75 to 6% free acid | 100.00 | 100.00 | 100.00 | 100.00 |
| High Abrasion Furnace Black (Philblack O) | 50.00 | 50.00 | 50.00 | 50.00 |
| Zinc Oxide | 3.00 | 3.00 | 3.00 | 3.00 |
| Phenyl beta naphthylamine (Neozone D) | 1.00 | 1.00 | 1.00 | 1.00 |
| Sulfur | 1.75 | 1.75 | 1.75 | 1.75 |
| Amine Derivative of Mercaptobenzothiazole (Santocure) | 1.00 | 1.00 | 1.00 | 1.00 |
| Liquid Asphalt (Paraflux) | 6.00 | 2.00 | 6.00 | 2.00 |
| Product of Example VII | 4.00 | 8.00 |  |  |
| Product of Example VI |  |  | 4.00 | 8.00 |

The above compounds were subjected to curing at 40 pounds steam pressure (287° F.) and the tables below give the results of tests carried out on the unaged stocks, tested at room temperature for tensile, percent elongation, 300 modulus, 500 modulus, and Shore creep:

*IX-A*

| Cure at 40 lbs. | M300% | M500% | Tensile | Per Cent Elongation | Shore Creep |
|---|---|---|---|---|---|
| 20' | 980 | 2,130 | 2,700 | 607 | 61-54 |
| 30' | 1,360 | 2,800 | 3,060 | 560 | 64-57 |
| 60' | 1,460 | | 2,970 | 485 | 66-59 |
| 90' | 1,580 | | 3,110 | 483 | 67-60 |
| 120' | 1,520 | | 2,940 | 490 | 68-60 |

*IX-B*

| Cure at 40 lbs. | M300% | M500% | Tensile | Per Cent Elongation | Shore Creep |
|---|---|---|---|---|---|
| 20' | 1,240 | 2,580 | 2,790 | 530 | 64-57 |
| 30' | 1,530 | 2,950 | 3,020 | 513 | 66-60 |
| 60' | 1,810 | | 3,140 | 487 | 67-60 |
| 90' | 1,680 | | 3,040 | 473 | 68-61 |
| 120' | 1,610 | | 3,050 | 477 | 68-61 |

*IX-C*

| Cure at 40 lbs. | M300% | M500% | Tensile | Per Cent Elongation | Shore Creep |
|---|---|---|---|---|---|
| 20' | 980 | 2,100 | 2,690 | 613 | 62-54 |
| 30' | 1,380 | 2,860 | 3,050 | 520 | 66-58 |
| 60' | 1,610 | 3,180 | 3,200 | 505 | 67-60 |
| 90' | 1,720 | | 3,010 | 463 | 67-60 |
| 120' | 1,530 | | 3,120 | 493 | 67-61 |

*IX-D*

| Cure at 40 lbs. | M300% | M500% | Tensile | Per Cent Elongation | Shore Creep |
|---|---|---|---|---|---|
| 20' | 1,070 | 2,290 | 2,750 | 590 | 63-56 |
| 30' | 1,450 | 2,920 | 3,030 | 520 | 66-58 |
| 60' | 1,680 | | 3,000 | 480 | 66-61 |
| 90' | 1,640 | | 3,040 | 463 | 68-61 |
| 120' | 1,710 | | 3,120 | 470 | 68-61 |

The new compositions are advantageously used in both synthetic rubber and natural rubber compositions and also for synthetic resin compositions. They are valuable detackifying compositions for both rubber and synthetic resin compositions and they are valuable cure-activating compositions for use in the vulcanization of both natural and synthetic rubber. They are also valuable as wetting agents, for example for the surface treatment of powders such as carbon black, zinc oxide and other rubber compounding pigments.

This application is a continuation-in-part of my prior application Serial No. 781,249, filed October 21, 1947, now abandoned.

I claim:

1. New detackifying and cure activation compositions in the form of stable, homogeneous liquid products which are diluted stearine pitch compositions diluted with a hydrocarbon diluent and over-neutralized with an excess of strong aliphatic amine in excess of that corresponding to the free fatty acid content of the stearine pitch; said composition consisting of the over-neutralized amine soaps resulting from the reaction of the fatty acids and amine in intimate admixture with the hydrocarbon diluent and the other constituents of the stearine pitch.

2. New detackifying and cure-activation compositions in the form of stable, homogeneous liquid products which are diluted stearine pitch compositions diluted with a hydrocarbon diluent and over-neutralized with an excess of an aliphatic polyethylene polyamine in excess of that corresponding to the free fatty acid content of the stearine pitch; said composition consisting of the over-neutralized amine soaps resulting from the reaction of the fatty acids and amine in intimate admixture with the hydrocarbon diluent and the other constituents of the stearine pitch.

3. New detackifying and cure-activation compositions in the form of stable, homogeneous liquid products which are diluted stearine pitch compositions diluted with a hydrocarbon diluent and over-neutralized with an excess of an aliphatic polybasic amine having intermediate imine groups and terminal amine groups, the amount of amine used for over-neutralization being in excess of that corresponding to the diacid amine soap.

4. New detackifying and cure-activation compositions in the form of stable, homogeneous liquid products which are diluted stearine pitch compositions diluted with a hydrocarbon diluent and over-neutralized with an excess of tetraethylene pentamine, the amount of tetraethylene pentamine used for over-neutralization being in excess of that corresponding to the diacid amine soap.

5. New detackifying and cure-activation compositions in the form of stable, homogeneous liquid products which are diluted stearine pitch compositions diluted with a hydrocarbon diluent and over-neutralized with an excess of diethylene triamine, the amount of diethylene triamine used for over-neutralization being in excess of that corresponding to the diacid amine soap.

6. A composition such as defined in claim 1, in which the excess amine corresponds to an excess of about 10%–25%.

7. A composition such as defined in claim 2, in which the excess amine corresponds to an excess of about 10%–25%.

8. A composition such as defined in claim 3, in which the excess amine corresponds to an excess of about 10%–25%.

9. A composition such as defined in claim 4, in which the excess amine corresponds to an excess of about 10%–25%.

10. A composition such as defined in claim 5, in which the excess amine corresponds to an excess of about 10%–25%.

EDWARD A. VAN VALKENBURGH.

REFERENCES CITED

The following references are of record in the file of this patent:

UNITED STATES PATENTS

| Number | Name | Date |
| --- | --- | --- |
| 2,052,607 | Cowdery | Sept. 1, 1936 |
| 2,368,807 | Cowdery | Feb. 6, 1945 |
| 2,379,413 | Bradley | July 3, 1945 |
| 2,396,669 | Auer | Mar. 19, 1946 |
| 2,414,065 | Scott | Jan. 7, 1947 |
| 2,435,478 | Tuter et al. | Feb. 3, 1948 |